(12) United States Patent
Winiger

(10) Patent No.: US 6,308,362 B1
(45) Date of Patent: Oct. 30, 2001

(54) MILLING DEVICE FOR PIPE CLEANING AND SANITATION TECHNOLOGY

(76) Inventor: Gerhard Winiger, Durntnerstrasse 39, CH-8304 Hinwil (CH)

( * ) Notice: Subject to any disclaimer, the term of this patent is extended or adjusted under 35 U.S.C. 154(b) by 0 days.

(21) Appl. No.: 09/582,991
(22) PCT Filed: Nov. 16, 1999
(86) PCT No.: PCT/CH99/00540
   § 371 Date: Aug. 21, 2000
   § 102(e) Date: Aug. 21, 2000
(87) PCT Pub. No.: WO00/30774
   PCT Pub. Date: Jun. 2, 2000

(30) Foreign Application Priority Data

Nov. 19, 1998 (CH) .................................................. 2320/98

(51) Int. Cl.$^7$ .................................................. B08B 9/02
(52) U.S. Cl. .................................... 15/104.05; 15/104.16
(58) Field of Search .............................. 15/104.05, 104.16

(56) References Cited

U.S. PATENT DOCUMENTS 5,378,092   1/1995   Griner et al. .

FOREIGN PATENT DOCUMENTS 40 22 543 C 1   1/1992   (DE) .
197 14 463 A 1   11/1997   (DE) .
WO 00/30774   6/2000   (WO) .

Primary Examiner—Randall E. Chin
(74) Attorney, Agent, or Firm—Welsh & Katz, Ltd.

(57) ABSTRACT

A Milling device for pipe cleaning and sanitation technology, is disclosed having an air driven milling motor mounted at a front end to a clamping body, a control rod for external manual control of the milling motor in its moveable axes. The milling motor and be positioned in an indefinitely variable in a radial manner.

10 Claims, 2 Drawing Sheets

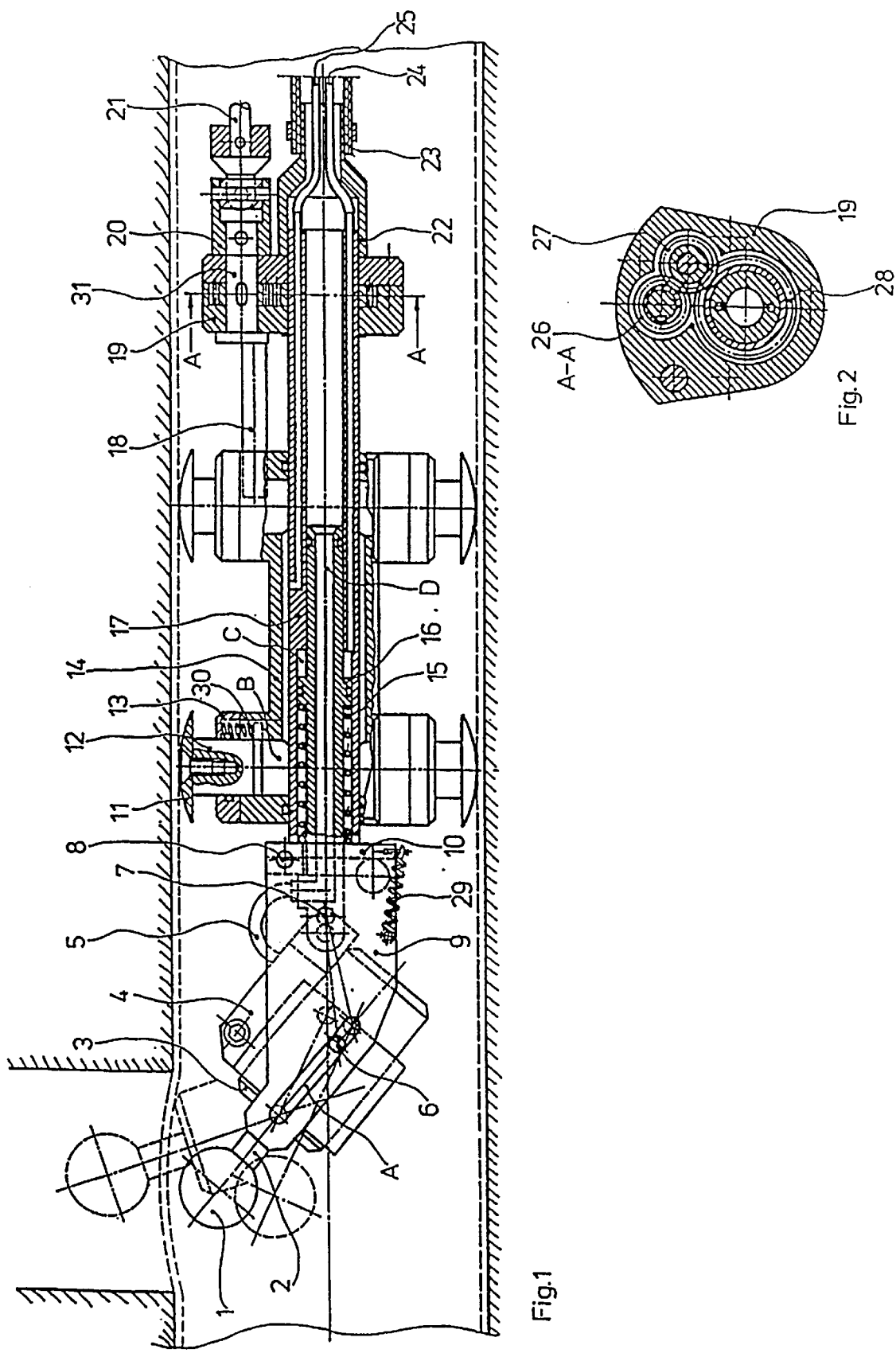

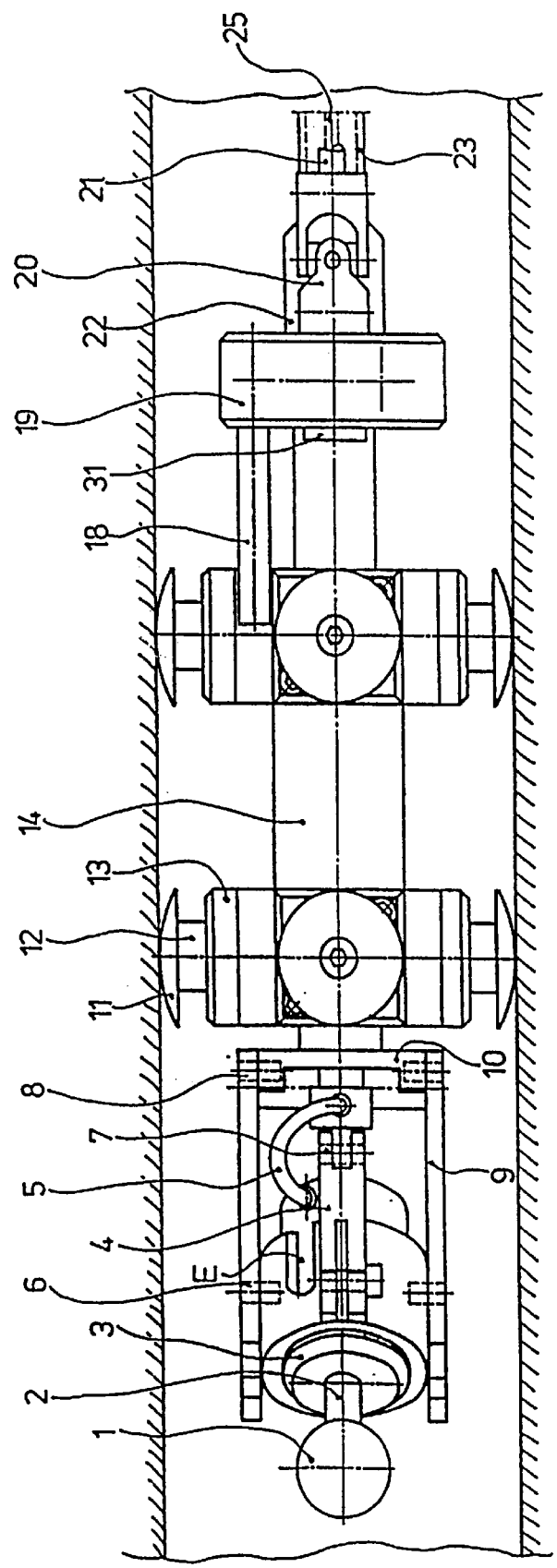

MILLING DEVICE FOR PIPE CLEANING AND SANITATION TECHNOLOGY

BACKGROUND OF THE INVENTION

The invention refers to a milling device for an application in the pipe cleaning and sanitation technology in order to mill away or ream out obstacles or sanitation material.

DESCRIPTION OF THE PRIOR ART

A considerable number of various milling devices are known in the art of the pipe cleaning technique which serve for a removing of solid deposits, of penetrating projecting connecting pipes and other flow obstacles such as grown in roots. In the inliner pipe sanitation technology such as described in the U.S. Pat. Nos. 4,009,063, and 4,067,211 milling devices are needed for the final working operations. For this task remote controlled milling devices are used often, such as e.g. described in the U.S. Pat. Nos. 4,577,388 and 5,378,092, and what open the inliner at a side inflow point of connecting pipes. At that point, use is made either of a self-propelled base device or of a base device which is manually positionable by control rods having an integrated or separate television camera and a freely moveable arm with a rotatable head for the receipt of various tools. The employment of these devices in the pipe cleaning or pipe sanitation proceeds with an external or internal television monitoring. The operation of such devices necessitates a high measure of experience and skill. Additionally there is the complicated mechanical and control-related design of the devices which gives rise to high costs of production. This leads, therefore, in the practice to restrictions regarding the application and handling. Furthermore, susceptibility to failure can not be avoided specifically in case of the electromechanical components and the prevailing working conditions in the pipe. This is augmented by the main drawback of these devices, the lack of the ability to negotiate curves in the pipes, such that the applicability of these milling devices is restricted.

SUMMARY OF THE INVENTION

Here the invention intends to provide a remedy. The invention solves the object of providing a rugged milling device which is easy to be operated for the pipe cleaning and sanitation technology at reasonable production costs and a broad range of application and which can negotiate curves.

Deviating from that which has been proposed until now, namely to power milling devices electromagnetically, the especially rugged and simple design of the invention operates without any electrical control or driving power. Accordingly, failures due to short circuits or creeping currents will be avoided. This is solved in accordance with the invention in that the milling device driven by an air motor is positioned in an infinitely variable manner in its vertical axis by a hydraulic cylinder either hydraulically or pneumatically. The air motor is clamped in a slideable manner between a U-shaped metal sheet with parallel guiding grooves formed therein. The parallel extending guiding grooves in the U-metal sheet can feature, depending on the position of the milling device, any possible shape of curves, preferably however, straight lines having a slope angle in a range of 20–60° relative to the position of the milling device.

The air motor which is clamped in the U-metal sheet with a support such to be able to slide, is connected in accordance with the invention to the stroke rod of the hydraulic cylinder via two centers of rotation. When the stroke rod of the hydraulic cylinder is extended, the milling device is pivoted radially away outwards along the guiding grooves in the U-metal sheet and can, therefore, operate at a sufficiently large distance in side inflows. The advantages of this proposed kind of controlling and positioning of the milling motor lie in the infinitely variable and precise course of the movement with a noticeable elasticity in case of counter forces, in a simple manner, with tactile feedback.

Hereto it is proposed in accordance with the invention to connect in case of the hydraulic solution the hydraulic cylinder of the milling device via a pressure hose in a closed system to a second hydraulic cylinder. The amount of the hydraulic fluid and the pressure of the hydraulic fluid needed for the moving of the milling cutter can now be produced in the simplest case by a manual lever or a manually rotatable handle. In case of a purely pneumatic solution the pneumatic cylinder is acted upon by pressurized air. In a most demanding case a computer supported control system may control the hydraulic cylinder. In order to have a improved capability of the milling cutter to negotiate curves the U-shaped metal sheet is designed to be able to pivot relative to the clamping body via a axial pivotal point located diametrically opposite of the lowermost point of the guiding groove and includes a restoring spring. The hydraulic or pneumatic cylinder proposed for the radial pivoting of the milling cutter is received in a clamping body. The object of the clamping body is to absorb the forces, which occur during the milling operation, and to allow precise milling due to the high stability of the guiding of the milling head. Because an ability to negotiate curves is demanded, it is proposed that the clamping body have an H-shape in the top and side view. The H-shaped design structure has a slender center part, thereby giving the ability to negotiate curves. In order to absorb the forces, which occur during the milling operation the clamping body is clamped in the inner pipe. This is done by radially arranged pneumatic cylinders, which represent in the top view and side view the vertical legs of the H-shape. The number of the radially arranged pneumatic cylinders may amount to three at both sides, preferably however, to four to six per side. Upon an action of pressurized air onto the radially arranged pneumatic cylinders which are separated from each other by the slender center portion, their piston rods with dish shaped clamping claws mounted to their ends extend radially and clamp the clamping body against the inner wall of the pipe. Instead of the dish shaped clamping claws it is possible to mount skids which interconnect two respective opposite pneumatic cylinders. This is preferred especially in case of strongly damaged pipes where the danger of jamming of the clamping claws exists. In order to prevent the clamping body from jamming tight should the feed of pressurized air fail, the pneumatic cylinders are equipped with restoring springs.

A further essential feature of the invention is represented by the design of the clamping body and the arrangement of the pneumatic cylinder formed therein and of the hydraulic or pneumatic cylinder, as well as the corresponding conduits for the feeding of the respective cylinders. The slender center portion of the clamping body includes a hydraulic or pneumatic piston which is arranged horizontally in the forward area and has at its inside a bore hole and is connected to the support of the milling motor. The hydraulic or pneumatic piston is somewhat milled down at both sides with the exception of a narrow intermediate portion which contains the O-ring for the sealing against the stroke rod; at the rear side for the shaping of the piston surface and at the front side for the receipt of a restoring spring. The piston area is formed by the diameter difference between the outer diameter of the narrow intermediate portion and the inner diameter of the stroke rod. The feed of pressurized air of the milling motor runs through the inner bore holes of the stroke rod and of the hydraulic piston. The sealing of the cylinder against the feed of the pressurized air is accomplished by an O-ring at the end of the piston. In accordance with the invention a restoring spring is foreseen opposite of the surface of the piston which is acted upon by pressure, which urges the milling cutter upon a reduction of the pressure back into the starting position. In accordance with the invention the H-shaped clamping body has a bore hole with a somewhat larger diameter at the slender center portion and contains in the longitudinal bore hole the above described stroke rod which is displaceable in an axial direction and can rotate freely, which encloses and seals the above-described hydraulic or pneumatic cylinder by two O-rings foreseen at its ends against the environment. In accordance with the invention the stroke rod includes two longitudinal bores in its jacket wall, one of which penetrates the jacket wall of the tube towards the outside by a radial bore for the feeding of pressurized air to the radially arranged pneumatic cylinders via the annular gap present in the slender center portion. The second longitudinal bore penetrates the portion of the jacket wall of the tube having a thicker wall thickness and serves to act upon the hydraulic or pneumatic cylinder through the annular gap which corresponds to the piston area. The U-shaped support of the milling motor is connected by this longitudinally displaceable and rotatable stroke rod over the hydraulic piston, so that the milling cutter can be operated in two axes through torsionally rigid control rods or a linkage manually or with aid of a mobile control apparatus via a signal line. The control of the third axis proceeds as already described through a hydraulic or pneumatic hose with a hydraulic or pneumatic cylinder. The rear closure of the clamping body is formed in accordance with the invention by a coupling piece with the corresponding couplings for the two pressurized air connections and the hydraulic fluid or for the three pressurized air connections. For a more responsive operation one would gear the linkage for a coupling to the control rod or to a mobile control apparatus via a transmission having three spur gears. By the selection of a transmission having three gear wheels which mesh in series the milling head, upon rotation by the control rod in a clockwise direction,is prevented from movement in a counter-clockwise direction.

BRIEF DESCRIPTION OF THE SEVERAL VIEWS OF THE DRAWINGS

In the following, the invention will be explained in more detail by reference to the drawings illustrating one single embodiment.

FIG. 1 is a longitudinal section through an embodiment of the milling device,of the subject invention FIG. 2 is a section A—A through the milling device, of FIG. 1

FIG. 3 is a top view of the milling device of FIG. 1

DETAILED DESCRIPTION OF THE INVENTION

In the figures a milling device for the application of a pipe cleaning and pipe sanitation technique for the milling away of obstacles or for forming an opening in the side inflows of connecting pipes in accordance with inliner-sanitation is illustrated, which device consists in its basic design of an H-shaped clamping body 14 with four pneumatic cylinders located at both ends star-shaped radially outwards, a motor support 4 with milling motor 3 at the front side and at the rear side a transmission housing 19 with a linkage 21 for control of the milling device by manual operating handle 31, as well as of a coupling part 22 for coupling to the control and power feed lines.

FIGS. 1, 2 and 3 illustrate embodiment of the milling device in the longitudinal section, in the section A—A and in the side view, whereby the milling motor 3 can be controlled in two axes through linkage 21; a third axis is controlled hydraulically or pneumatically. Rotational movements at the linkage 21 or a torsionally shift control rod 21 which can negotiate curves are transmitted and reduced through a universal joint 20 which is coupled to the driving spur gear 26 in the gear housing 19 and through a guide spur gear 27 onto the driven spur gear 28. The driven spur gear 28 is rigidly mounted to the stroke rod 17 having an inner through bore and projecting through the clamping body 14 at its center, onto the head of which the support 9 with the milling motor 3 is mounted. Accordingly, rotations at the linkage 21 are directly transmitted with a corresponding reduction due to the spur gear pair 26, 28 onto the milling motor 3. The stroke rod 17 is sealed in the clamping body 14 at both its ends by an O-ring, freely rotatable and translatable in an axial direction to a limited extent by the distance between the rear side of the clamping body 14 and the front side of the two-partite transmission housing which is fixed radially by a lock 18 against rotation 11 relative to the claming body. This distance should not be selected to be too large, in order to not decrease the ability of the milling device to negotiate curves. The stroke rod 17 has a inner bore and includes at the front part piston 16 having an inner bore, of which the length amounts to about half of the length of the stroke rod 17 and of which the front area is reduced by a milling for the receipt of a pressure spring 15. At the longitudinal center the piston 16 features a somewhat larger diameter for the receipt of an O-ring which seals against the stroke rod. The rear end of the piston 16 is somewhat reduced regarding the diameter by a milling and is located translatable in the stroke rod 17 and sealed at its end by a second O-ring. The difference of diameter between the two outer diameters of the piston 16 leads to a effective ring shaped area for the hydraulic or pneumatic moving of the piston 16. The piston 14 is mounted of its front side through a stroke bolt 7 and a guiding bolt 6 to the motor support 4.

When the piston 16 is acted upon by pressure, the motor support 4 is moved axially forward and urges the milling motor 3 clamped slidingly in the U-shaped support 9 in guiding grooves A extending parallel and upwards by an angle 30° radially outwards. Because the piston 16 is acted upon hydraulically or pneumatically, the piston 16 and the milling motor 3 can be placed into infinitely variable intermediate positions. In order to increase the ability to negotiate curves the U-shaped support 9 is designed to be axially pivotable via a pivot pin 8 positioned diametrically opposite at the lowermost point of the guiding grooves A by means of the pivot support 10. The tension spring 29 which is stretched between the pivot support 10 and the support 9, which pulls these two parts together is intended to restore the support 9 after having negotiated a curve.

The H-shaped clamping body 14 includes cubicle shaped pneumatic cylinder housings each having a lid 13 and arranged separated by a slender center portion in a mirror-inverted star shaped arrangement. The pneumatic cylinder housings are bored out cylindrically at their inside up to the stroke rod 17. In order to receive two pressure springs 30 per cylinder, the cylinder inner walls are drilled out at two locations opposite one another in their longitudinal direction with a radius corresponding to the diameter of the pressure springs 30 and piercing the inner cylinder jacket wall. The length of these longitudinal grooves is determined by the thickness of the means for locking the pressure piston 12, against rotation which engages the two grooves in a form locked manner and by the total length of the pressure spring 30 minus the partial length of the pressure spring 30 which is located in a corresponding bore in the lid. The lid 13 includes a bore in the inside for the receipt of the pressure piston 12 and seals the pressure piston by an O-ring against the lid 13. The lid 13 is fixedly mounted to the clamping body by two screws located at 900 relative to the grooves. The pressure piston 12 includes at its piston head two extensions staggered by 180° as a lock against rotation and as an end abutment, which are designed in such an manner that they fit in a locked state with play in the grooves. The pressure springs 30 are each located between the means for locking the pressure piston 12 against rotation and the bottom of the bore in the lid 13 for the receipt of the pressure spring 30. The upper part of each pressure piston 12 is closed off by a dish-shaped clamping claw of a preferably abrasion proof plastic material which is mounted at the piston head by a screw.

The milling motor 3 is supplied by pressurized air through the air hose 23, which is mounted to the coupling part 22. The pressurized air reaches the milling motor 3 through the inner bore of the stroke rod 17 over the inner bore of the piston 16 and by means of a hose 5. The supply of pressurized air for the clamping of the light pistons at the H-shaped clamping body 14 proceeds through a pneumatic hose 25 which is coupled to the coupling part 22 and is surrounded by the hose 23 for feeding the pressurized air of the milling motor 3, through a longitudinal bore in the stroke rod jacket wall 17, which penetrates through same 17 at the area of the slender center portion of the clamping body 14 radially outwards, such that all eight pistons are evenly acted upon via the annular gap in the clamping body formed by a somewhat larger bore in the slender intermediate portion. The supply by hydraulic fluid or pressurized air needed for the radial pivoting movement of the milling motor 3 proceeds by the hydraulic fluid pressurized air conduit 24 which is also surrounded by the hose 23 for the pressurized air supply to the milling motor 3, through a longitudinal bore in the jacket of the stroke rod 17, air conduit 24 penetrates the stroke rod 17 at the location of the increased milling out for the receipt of the front part of the piston 16 and the pressure spring 15 and leads to the back side of the piston 16.

What is claimed is:

1. Milling device for pipe cleaning and sanitation technology, comprising an air driven milling motor having a first end, a second end, and a vertical axis, said milling motor mounted at said first end to a clamping body, a universal joint, a linkage for external manual control of the milling motor coupled through said universal joint onto said second end opposite said first end of the clamping body, wherein the milling motor is movable on said vertical axis at each of two spaced pivot points by a first piston in an infinitely variable radial movement, the clamping body having an H-shaped design and having a center portion and star-shaped second pistons for clamping an inner wall of the pipe, the first piston being freely rotatable and axially displaceable in the clamping body.

2. Milling device according to claim 1, further including a U-shaped support affixed at one end, wherein, the milling motor is clamped to slide between said U-shaped support with parallel guiding grooves formed therein, the parallel guiding grooves being straight lines with a slope angle in the range of 20–45° relative to the position of the milling device.

3. Milling device according to claim 2, wherein, for an improved ability to negotiate curves relative to the clamping body, the U-shaped support is pivotable with an axial center of rotation.

4. Milling device according to claim 1, wherein, the first piston includes a pressure spring.

5. Milling device according to claim 1, wherein, the clamping body includes a bore in the center portion, which forms an annular gap to the outer diameter of the first piston.

6. Milling device according to claim 1, wherein, the first piston is bored out at its inner side as a pressurized air line for the milling motor, said first piston having a jacket, including two longitudinal bores for feeding the first piston with hydraulic fluid or pressurized air.

7. Milling device according to claim 1, wherein, the second pistons have pressure springs formed in the clamping body.

8. Milling device according to claim 1, wherein the first piston includes an interior longitudinal bore.

9. Milling device according to claim 1, further including a coupling piece for forming a reverse side covering with two connections for the feeding of pressurized air to the second pistons and of hydraulic fluid or pressurized air for the first piston and having a hose for the feeding of pressurized air to the milling motor.

10. Milling device according to claim 9, having control movements with a coupling piece spur gear transmission encapsulated in a housing and to the first piston.

\* \* \* \* \*